United States Patent [19]

Bazell

[11] Patent Number: 4,501,671
[45] Date of Patent: Feb. 26, 1985

[54] METHOD AND APPARATUS FOR TREATMENT OF OILY WASTE

[75] Inventor: Graydon C. Bazell, Poughkeepsie, N.Y.

[73] Assignee: Alfa-Laval, Inc., Poughkeepsie, N.Y.

[21] Appl. No.: 567,872

[22] Filed: Jan. 3, 1984

[51] Int. Cl.³ .............................................. B01D 33/02
[52] U.S. Cl. ..................................... 210/781; 210/787; 210/804; 210/360.1; 210/532.1
[58] Field of Search ............... 210/767, 768, 781, 787, 210/532.1, 804, 515, 634, 242.3, 923, 924, 740, 776, 789, 799, 800, 803, 804, 805, 806, 194, 195.1, 196, 197, 199, 255, 360.1, 369, 378, 540

[56] References Cited

U.S. PATENT DOCUMENTS

| 2,405,158 | 8/1946 | Mensing | 210/532.1 |
| 3,764,008 | 10/1973 | Darley et al. | 210/781 |
| 3,781,201 | 12/1973 | Carmicheal et al. | 210/924 |
| 3,799,343 | 3/1974 | Lang | 210/781 |
| 4,175,040 | 11/1979 | Sammons et al. | 210/781 |
| 4,196,077 | 4/1980 | Berkowitz et al. | 210/787 |
| 4,361,490 | 11/1982 | Saget | 210/787 |

Primary Examiner—Richard V. Fisher
Assistant Examiner—Wanda L. Millard
Attorney, Agent, or Firm—Cyrus S. Hapgood

[57] ABSTRACT

Oily waste is separated by gravity settling into a light oil phase forming an upper layer and a heavy phase forming a lower layer. An overflow stream of oil passes from the upper layer to a raw fuel storage tank while an underflow from the lower layer, after addition of diesel oil, is centrifugally separated into a light component of oil with some water which is returned to the gravity settling, an intermediate component of clarified water which is discharged to a sewer, and a heavy sludge component which is fed to a second centrifuge for separation into substantially dry solids and a mixture of water and residual oil which is returned to the gravity settling.

10 Claims, 1 Drawing Figure

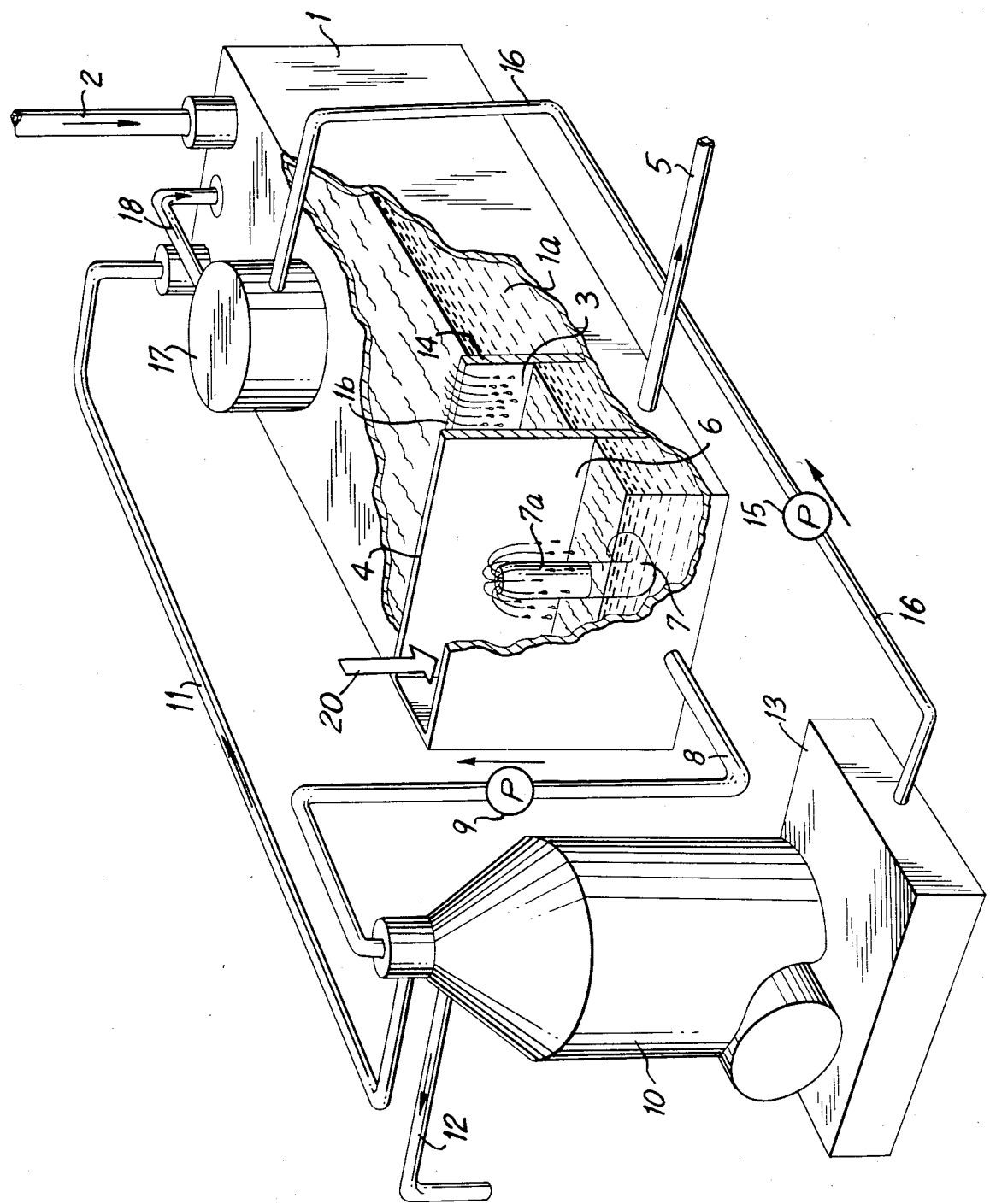

METHOD AND APPARATUS FOR TREATMENT OF OILY WASTE

This invention relates to the treatment of oily waste, such as oily water effluent from gas turbine fuel treatment systems and other oily wastes from power plants. More particularly, the invention relates to a novel method and apparatus for such treatment.

The waste from power plants typically contains water, oil and sludge. Since the waste generally is heavily contaminated, it cannot be readily discarded without creating environmental pollution. Moreover, the oil content of such waste is of substantial value. Accordingly, there is a demand for a method and apparatus by which the waste can be treated economically to recover its oil content while providing for easy disposal of its other components without danger of environmental pollution.

The principal object of the present invention is to provide a method and apparatus which meet such demand.

According to the invention, the oily waste is fed to a gravity settling tank where it is separated into a light oil phase and a heavy phase containing water, solids and residual oil. The light oil phase is continuously passed to storage by way of an overflow outlet from the tank while a stream of the heavy phase passes as an underflow from the tank to a first centrifuge. There, it is centrifugally separated into a light component including oil with some water, an intermediate component of clarified water, and a heavy sludge component, the clarified water being suitable for discharge directly into a sewer. The light component is returned to the settling tank while the sludge component is fed to a basket centrifuge which separates it into substantially dry solids and a liquid mixture which is primarily water. The solids are easily disposable without further treatment, and the liquid mixture can be returned to the settling tank for recovery of its residual oil content.

Preferably, the heavy phase from the settling tank is mixed with a solvent for dissolving any asphaltic substances and diluting the organic content of the feed to the first centrifuge, and the latter is of the type which discharges the sludge at predetermined intervals into a sludge tank, the basket centrifuge being fed continuously from the latter tank.

Thus, the method and apparatus of the invention can be operated continuously and can be made completely automatic except for final removal of the solids.

For a more complete understanding of the invention, reference may be had to the following detailed description in conjunction with the accompanying drawing, in which the single illustration is a schematic view of a preferred form of the new apparatus, with parts broken away.

The apparatus as illustrated comprises a tank 1 having a settling chamber 1a for receiving oily waste from a supply pipe 2. The feed through pipe 2 may be derived from a power station which burns residual fuels in gas turbines and/or diesel engines. By gravity settling in chamber 1a, the waste is separated into a light oil phase forming an upper layer and a heavy phase forming a lower layer containing water, solids and residual oil.

Settling chamber 1a has an overflow outlet 1b for discharging oil into a chamber 3 formed between an end wall of tank 1 and an opposing vertical wall 4. From chamber 3, the oil flows continuously through discharge pipe 5 to a raw fuel storage tank (not shown).

Wall 4 partly defines a second separate chamber 6 to which heavy phase is delivered continuously from the lower portion of settling chamber 1a. As shown, this delivery is effected through a duct 7 by-passing oil chamber 3 and terminating in a vertically adjustable section 7a. To provide for a low content of impurities in the oil discharging at 5, the oil/water interface is maintained high in the settling chamber by suitable adjustment of duct section 7a to regulate the underflow into chamber 6.

From chamber 6, the heavy phase is fed through duct 8 and pump 9 to a centrifuge 10. The latter is of the type which effects a three-way separation into a first liquid component of relatively low density, a second liquid component of intermediate density, and a solids component of relatively high density. An example of such a centrifuge is the Alfa-Laval solids ejecting centrifugal separator type WSPX, which ejects the solids at pre-set adjustable intervals, the other two separated components being discharged continuously.

In centrifuge 10, the heavy settled phase is separated into a light component which is oil containing some water and which is returned to the settling tank through pipe 11, an intermediate component of clarified water which can be discharged through pipe 12 to a sewer, and a heavy component of sludge which is discharged intermittently into a sludge tank 13 located beneath the centrifuge.

From tank 13, sludge is delivered continuously by pump 15 through duct 16 to a basket centrifuge 17, where the solids are dewatered and compacted. The semi-dry solids recovered from the second centrifuge 17, consisting mainly of sand, rust, scale and dirt, can be easily disposed of directly as land fill or in a common garbage disposal system. The liquid separated from the solids can be returned to settling tank 1, as indicated at 18, for recovery of its oil content.

EXAMPLE

A system for purifying about 100 USGPM of No. 6 fuel oil is provided for a large power station and serves primarily to reduce sodium levels (salt) to about 1 ppm. Particulates are removed in the system's centrifuge by a water-washing operation in which water is mixed with the fuel and separated in two counter-current stages. Water flow is about 10% of the fuel flow or 10 USGPM. The water effluent from the system is heavily contaminated with No. 6 fuel, particulates, algae and salt. The centrifuges discharge at intervals of about two hours, expelling a very objectionable sludge consisting of asphaltic substances, particulates such as sand, rust, scale, clay, and other solids, and No. 6 fuel oil and water. The volume of this sludge is about 15 gallons per hour. The above effluents constitute a total plant waste of about 615 gallons per hour.

This waste is unacceptable as a waste stream in today's highly environmentally-conscious society. It is a cause for great concern not only in the matter of environmental pollution but also heavy fuel losses.

The above-noted waste is fed to settling tank 1 at a rate of about 615 gallons per hour. The oil discharge through pipe 5 to untreated storage can vary from 0 to 5 GPM. The underflow feed from chamber 6 to centrifuge 10 is also quite variable depending upon the instantaneous conditions in the system from which the waste is derived, but is is attempted to hold this value constant at about 25 GPM. Of course, a considerable volume of water can recycle to chamber 6 to permit this value to be held constant regardless of variations in the incoming feed through pipe 2.

Clear water discharge through centrifuge outlet 12 is also held constant at about 25 GPM. The return feed of oil with some water from centrifuge 10 through pipe 11 will vary considerably from 0 to about 5 GPM, depending upon variables such as the amount of oil and other constituents in the feed through pipe 2. Sludge discharge from tank 13 is held at a small rate such as 0.1 GPM. Centrifuge 10 discharges its separated sludge into tank 13 at intervals of about six hours, making a total flow of about 10 gallons in about six hours. The return feed of water and oil from basket centrifuge 17 to settling tank 1 is only about 0.1 GPM.

Diesel oil is fed to chamber 6 at a rate of about 0.25 GPM and serves as a solvent to dissolve any asphaltic sludges in the underflow from settling chamber 1a and dilute the organic components of the underflow. This diesel oil is not lost to eventual combustion in the main engines of the system from which the oily waste is derived, since the diesel oil accompanies the oil discharging through pipe 5 to the untreated oil tank for supplying the main engines.

Coalescing elements are provided in tank 1 to expedite the gravity settling. Such elements may be materials known in the trade as raschig rings which aid the separation by providing a large surface to the incoming stream. They also act to quiet the settling chamber from the violent entry of the material being fed to this chamber.

Tank 1 is provided with heating means (not shown) to maintain the temperature of the material therein at about 190° F. This causes a reduced viscosity of the heavy fuel, which is beneficial to sedimentation.

The above-described method and apparatus serve to process the oily waste into three main effluents as follows:

(a) Fuel which can be returned to the untreated fuel storage tank for re-processing through the main fuel treatment system of the power station.

(b) Water containing less than 10 ppm of organic matter, slightly salty to the taste and completely acceptable to most municipal sewers.

(c) Inorganic particulates which are compacted and slightly contaminated with organic matter. In the above example, the volume of these particulates is about one cubic foot per day, which is small enough to be easily discarded without further processing.

I claim:

1. In the treatment of oily waste containing oil, water and solids, the method which comprises feeding said waste to a gravity settling tank and there separating the waste into a light oil phase and a heavy phase containing water, solids and residual oil, continuously withdrawing oil as an overflow stream from said tank, continuously passing heavy phase as an underflow from said tank to a first centrifuge and there centrifugally separating said underflow into a light component including oil with some water, an intermediate component which is mainly clarified water, and a heavy sludge component containing some water, continuously returning said light component to the settling tank, continuously and separately discharging said intermediate component from the centrifuge, and passing said separated sludge component to a second centrifuge and there centrifugally separating the sludge component into substantially dry solids and water.

2. The method of claim 1, which comprises also adding to said underflow, prior to separation in said first centrifuge, a solvent for asphaltic components of said heavy phase.

3. The method of claim 2, in which said underflow is held in a separate chamber on its way to said first centrifuge, said solvent being fed into said chamber.

4. The method of claim 1, in which said separated sludge component is discharged intermittently from the first centrifuge into a sludge tank, said sludge component being passed substantially continuously from the sludge tank to said second centrifuge.

5. The method of claim 1, in which said separated sludge component from the first centrifuge and said water from the second centrifuge contain some oil, said water and oil from the second centrifuge being returned to said settling tank.

6. The method of claim 1, which comprises also holding said underflow in a separate chamber on its way to said first centrifuge, adding to the underflow in said chamber a solvent for asphaltic components of said heavy phase, discharging said heavy sludge component intermittently from the first centrifuge into a sludge tank, said sludge component being passed substantially continuously from said sludge tank to said second centrifuge.

7. The method of claim 6, in which said separated sludge component from the first centrifuge and said water from the second centrifuge contain some oil, said water and oil from the second centrifuge being returned to said settling tank.

8. Apparatus for treating oily waste, which comprises a settling tank having an inlet for said waste, means forming an oil-receiving chamber and a water-receiving chamber, said tank having an overflow outlet leading to said oil-receiving chamber, an underflow discharge line leading from the tank to said water-receiving chamber, a first centrifuge for performing a three-way separation, means for passing a continuous stream from the water-receiving chamber to the centrifuge, the centrifuge having a first outlet for clarified water, a second outlet for oil with some water, and a third outlet for sludge, a return line connecting said second outlet to the settling tank, and a basket centrifuge communicating with said third outlet and operable to separate said sludge into a solids component and a water and oil component.

9. The apparatus of claim 8, comprising also a duct for returning said water and oil component to the settling tank.

10. The apparatus of claim 9, comprising also a solvent supply line leading to said water-receiving chamber and a sludge tank, said first centrifuge being operable to discharge sludge intermittently from said third outlet to said sludge tank, the basket centrifuge communcating with said third outlet through said sludge tank.

* * * * *